Patented May 9, 1933

1,908,601

UNITED STATES PATENT OFFICE

GEORGE D. GRIDLEY, OF ROCHESTER, NEW YORK, ASSIGNOR TO EASTMAN KODAK COMPANY, OF ROCHESTER, NEW YORK, A CORPORATION OF NEW YORK

PROCESS OF CEMENTING

No Drawing.   Application filed August 26, 1931.   Serial No. 559,603.

This invention relates to cements for sticking cellulose acetate objects to copper. Its object is to provide a cement which will cause a sheet comprising cellulose acetate to adhere firmly to a sheet of copper, without corroding the copper.

I have found that a mixture of lactic acid and ethyl alcohol makes a very satisfactory cement for sticking cellulose acetate to copper. It is known that lactic acid and ethyl alcohol are swelling agents for cellulose acetate, but no one has heretofore, to my knowledge, prepared a cement composed of lactic acid and ethyl alcohol.

I prefer to compound my novel cement by mixing approximately equal volumes of lactic acid and ethyl alcohol. While this is my preferred formula, it will be understood that I may vary the proportions of the constituents considerably. Moreover, it is not necessary for me to use pure ethyl alcohol. I may use certain denatured ethyl alcohols, such, for instance, as ethyl alcohol denatured by adding 5 volumes of methyl alcohol to 100 volumes of the ethyl alcohol.

In cementing a sheet comprising cellulose acetate to a sheet of copper, I first thoroughly clean the copper sheet and allow it to dry. I then apply my novel cement to an area of the copper sheet equal to the area of the cellulose acetate sheet to be cemented thereto. I then press the cellulose acetate sheet and the moistened area of the copper sheet firmly together until the cement has dried. This fastens the cellulose acetate sheet securely to the copper sheet.

What I claim as my invention and desire to be secured by Letters Patent of the United States is:

A process of cementing a sheet comprising cellulose acetate to a sheet of copper, which comprises applying to a clean, dry sheet of copper a cement comprising lactic acid and ethyl alcohol, and pressing against the copper moistened with the cement a sheet comprising cellulose acetate.

Signed at Rochester, New York, this 4th day of August 1931.

GEORGE D. GRIDLEY.